(No Model.) 2 Sheets—Sheet 1.

S. WRIGHT.
MACHINE FOR TURNING OR SHAPING THE HEADS OF CASKS.

No. 477,039. Patented June 14, 1892.

Witnesses:
George Baumann
John Revell

Inventor
Samuel Wright
By his Attorneys
Howson and Howson

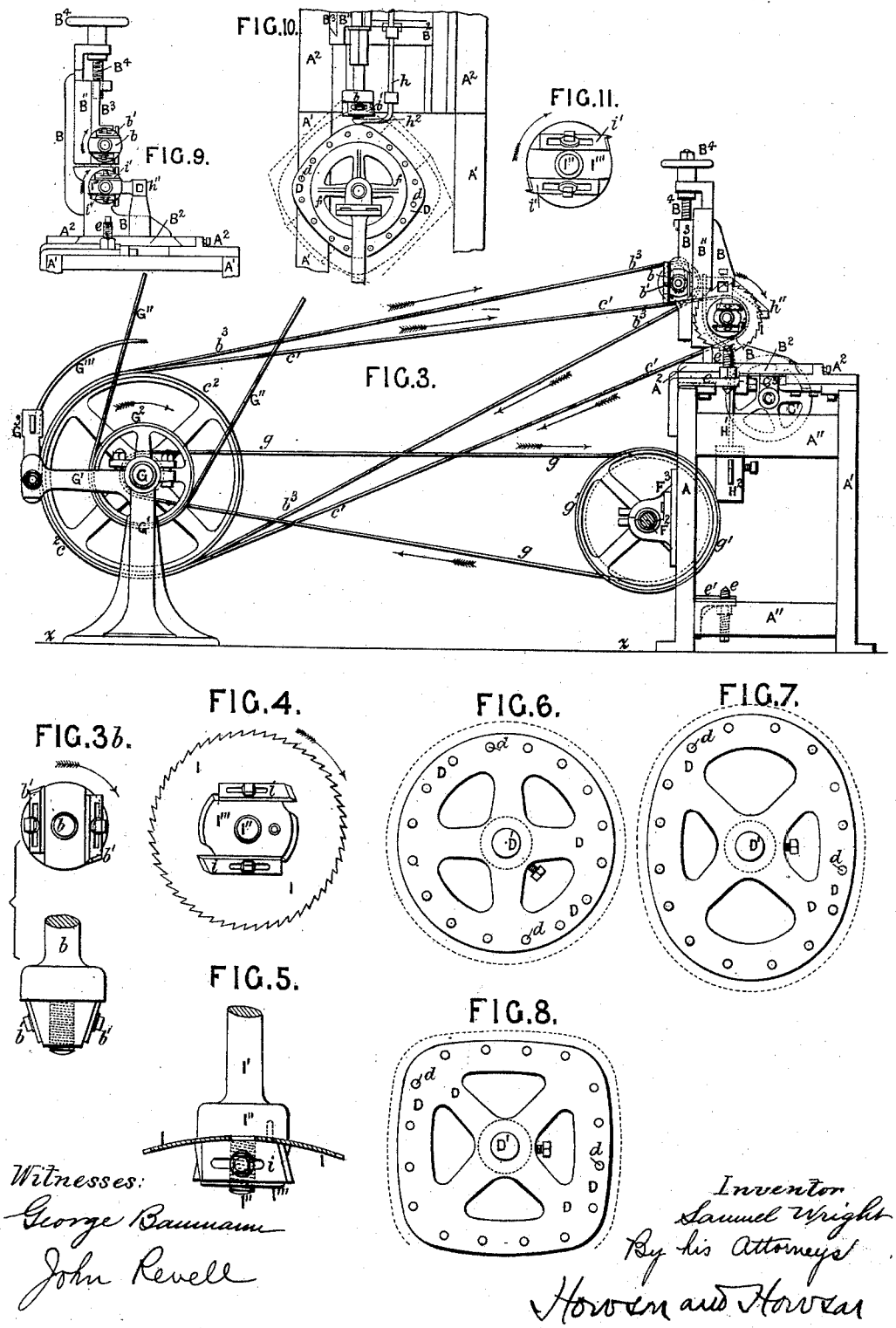

UNITED STATES PATENT OFFICE.

SAMUEL WRIGHT, OF GLASGOW, SCOTLAND, ASSIGNOR TO HIMSELF, JAMES MUIR, AND WILLIAM BOYD, OF SAME PLACE.

MACHINE FOR TURNING OR SHAPING THE HEADS OF CASKS.

SPECIFICATION forming part of Letters Patent No. 477,039, dated June 14, 1892.

Application filed April 21, 1890. Serial No. 348,887. (No model.) Patented in England January 14, 1888, No. 612; in Germany May 8, 1888, No. 45,899; in France August 24, 1888, No. 192,570; in Belgium August 25, 1888, No. 83,009, and in Spain January 2, 1889, No. 8,778.

*To all whom it may concern:*

Be it known that I, SAMUEL WRIGHT, machinist, a subject of the Queen of Great Britain and Ireland, residing at 96 Buchanan Street, Glasgow, in the county of Lanark, Scotland, have invented an Improved Machine for the Turning or Shaping of the Heads or Ends of Casks, Barrels, and other Like Articles, of which the following is a specification.

Patents have been obtained for said invention in Great Britain, No. 612, dated January 14, 1888; in France, No. 192,570, dated August 24, 1888; in Belgium, No. 83,009, dated August 25, 1888; in Spain, No. 8,778, dated January 2, 1889, and in Germany, No. 45,899, dated May 8, 1888.

My said invention has reference to a new or improved construction of machine or combination of the parts thereof for the turning or the shaping of the heads or ends of casks, barrels, box-barrels, hogsheads, and other like articles which is more simple in construction and efficient in action than machines heretofore in use for this purpose; and in order to enable others skilled in the art to which my invention relates to understand how it may be carried into effect or practice I have hereunto appended two explanatory sheets of drawings, in which the same reference-letters are used to indicate corresponding parts in all the figures where shown.

Figure 1:
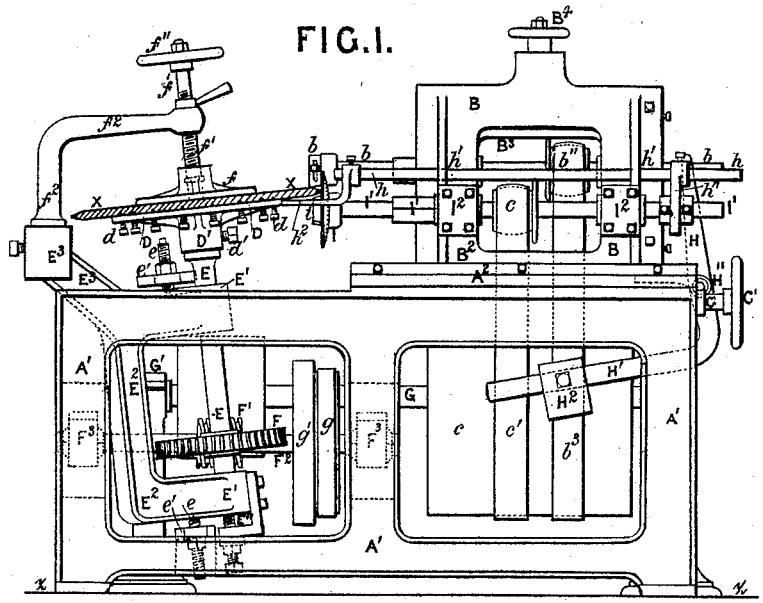
Figure 2:
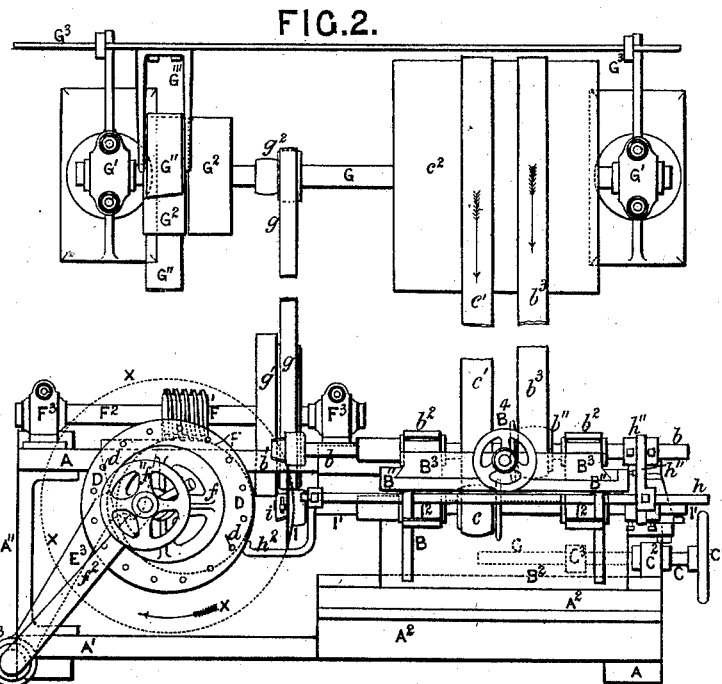

Figure 1 on Sheet 1 is an elevation of my new or improved construction of machine or combination of mechanism for turning or shaping the heads or ends X of casks, barrels, and other like articles; and Fig. 2 is a corresponding plan, also showing broken away the arrangement of counter-shaft G and driving-band gearing for operating the working parts of the machine, while Fig. 3 on Sheet 2 is an end elevation of the machine and driving-gearing, looking on the concave saw I, with the oscillating frame E to E⁴ which carries the head-boards X removed, the arrows indicating the direction of motion of the several bands and spindles. Fig. 3$^b$ is an end and plan view, detached, of the boss-head and cutter $b'$. Figs. 4 and 5 are an end view and sectional plan, respectively, of the concave saw I and cutters $i$ $i$ and part of their driving-spindle I' detached, to a large scale, to show the details more clearly than in the general views of the machine, Figs. 1 to 3; and Figs. 6, 7, and 8 show plan views of the table-disks D D' for receiving the wood boards X to be cut into heads or ends of barrels or box-barrels, the edges of which form guides for shaping them to the round, oval, or square shape, with rounded corners, respectively. Figs. 9 and 10 show an elevation and plan, respectively, of a modified form of the duplex slide-frame and head-stock for carrying the cutter-spindles I' $b$, all secured on the top of the main frame A A', especially applicable for forming irregular-shaped heads X, as oval, or rectangular with rounded corners, as indicated in Figs. 7 and 8, respectively; and Fig. 11 shows an end view of the cutter-head I" I''' and cutters $i$ of the lower spindle I', employed in this case instead of the saw I, used for making round heads X, as indicated in Fig. 6.

Referring to the drawings, the improved machine is constructed of strong open-side frames A A', strongly secured together by rails A" at their opposite ends, with a guide-slide table plate or frame A² bolted on the top of these frames A A' at the back end, all at or near a height convenient for persons to apply and secure the roughly-prepared pieces of board or wood X to the machine and remove them when cut and turned or finished at the front end. The roughly-prepared boards X, with their edges jointed and scored to suit each other or previously grooved or doweled, as desired, are mounted and secured horizontally on the top of the flat circular disk or plate D with bored eye or boss D', preferably with sharp spikes or screws with points $d$ on the top to hold the pieces X in the position they are set. This holding and turning disk D and boss D' is mounted and secured by a pinching-screw $d'$ on the upper end of a vertical or angular rotating spindle E in bush-bearings E' in the upper and lower ends of a horizontal oscillating or reciprocating vertical frame E² and adjusted to a proper height by a center-screw spindle E''', secured in a bracket to the lower arm of the oscillating frame E² and fulcrumed to oscillate, preferably, on center-screw spindles $e$ in brackets $e'$, screwed to the upper and lower ends of the one-side frame A. This spindle E and its disk D D', with the wood X on it to be dressed to the circular or other form of the cask-head, is actuated to be turned at a slow speed, preferably by a screw spur-wheel F, secured near the lower end of the spindle E, gearing into the screw F' on the horizontal shaft F², carried in the bearing-brackets F³, bolted to the lower part of the back main frame A and driven nearly at right angles to a line through the axial centers $e\ e$ of the rocking frame E², carrying the rotating spindle E and actuated at different slow speeds through the screw-shaft F² from the first-motion shaft of the machine or any counter-intermediate shaft, as G, (shown carried in bush-bearing standards G' from the floor $z$,) some distance behind the main frame A A' of the machine, so that when the wheel F on the spindle E with its frame E² is shifted or oscillated forward into gear with the screw F' it is turned, and when reciprocated outward is stopped for the taking off of the finished heads X and putting on of new wood. This oscillating or reciprocating frame E² is moved to and from a circular concave saw I and cutters $i\ i$, hereinafter described, for shaping the head X, secured on its rotating spindle E by hand or the back arm E³. Different sized and shaped disk boss-heads D would be screwed on the top of the vertical spindle E to suit the size and shape of heads X of casks, as indicated in Figs. 6, 7, and 8, being formed or fitted each with sharp points or spikes $d$, projecting above their upper surface for securing of the wood X, and the edges of the rings D may form the templet for guiding the cutter, as hereinafter described, and separate rings may be fitted below for raising the finished wood off the spikes or points $d$. The wood X would be held down on these spikes $d$ by a disk $f$, or it might be a cross-bar or other equivalent mounted loose by a boss on the lower point of a screw-spindle $f'$ with hand-wheel $f''$ above in line with the axis of the shaft E below, mounted through a bow-arm or bracket $f^2$, secured in the back arm or lever E³ of the oscillating frame F², carrying the vertical spindle E on the opposite side to the saw I and cutters $i\ i$, and which I term the "head" spindle E. The screw-shaft F² is turned at different slow speeds by an open belt $g$, passed over large stepped pulleys $g'$ on it, and over corresponding stepped small pulleys $g^2$ on the first-motion counter-shaft G, which is driven from any convenient motive shaft of the works by the belt G'', passed over fast and loose pulleys G² on one end of the shaft G, fitted with shifting-belt fork G''' and slide hand-rod G³.

The cutting and shaping mechanism consists of a moving open rectangular vertical frame B with right angle or horizontal and vertical webs or plate-slides B²B'', the former B² working in the guide-slides A² A² on the top of the frames A A' and carrying the bearings I² of the lower cutter-spindle I' with the saw I on it and also a corresponding upper spindle $b$ of a rotating knife, planing or cutting head, and cutters $b'$, carried in the bearings $b^2$ of the vertical slide-frame B³, mounted in the vertical guide-slides B'', carried and shifted and set by the screw-spindle and hand-wheel B⁴ at top on this frame B B'', which I term the "tool-cutting head-stock" B to B⁴, constructed and actuated all as hereinafter described. This upper spindle $b$ and its cutters and cutter-head $b$ are shown detached, to a large scale, in end and plan view, respectively, in Fig. 3ᵇ, to show their construction more clearly than can be seen in Figs. 1 to 3. This right-angled framed head-stock B to B⁴ carries the spindle I' of the saw I and cutters $i$ and the spindle $b$ of the rotating planer or cutter $b'$, the former I' a little below the horizontal line of the holding-plate D of the wood head X, which the saw I has to cut and shape round the edge, and that of the latter $b$ higher up and behind the spindle I' of the saw I to clear this and allow its cutting-knives $b'$ and boss to turn or dress the upper face edge of the wood head as the saw I and its cutters $i$ shape it to the required size and thickness at its edge and under side for round heads and work just clear of and beyond the saw I, both spindles I' $b$ being mounted nearly horizontal and parallel to each other and to their slides B² B'' B³ and guides A² in the top bed-plate, so that the slide head-stock B and spindle I' and $b$ of the saw I and cutters $b'$ traverse forward, or nearly radially, toward the vertical spindle E, carrying the wood X of the barrel-head to cut and shape this nearly tangentially at the circumference indicated by a dotted line X in Fig. 2 and in Figs. 6 to 8. This traversing of the head-stock B B² B'' and its saw I and cutters $b'$ to or from the wood X to be cut is effected by the screw-spindle C, with hand-wheel C' outside mounted in the journal-bracket C² and nut C³ below its bed-slide B², (similar to that of the slide-rests of turning-lathes,) to suit the different-sized barrel-head X to be cut. The said slide-reciprocating cutting-head stock B B², supported on the bed A², carries the long journal bush-bearing I² of the rotating and reciprocating spindle I' of the circular saw I, which is secured on the front screwed end or boss I'' by the gripping-boss I''' of the cutters $i\ i$, or it might be by a collar and a screw nut or nuts. The saw I is concave on its front side, so that when it is traversed forward by its spindle I' in its bearings I², or with the slide carrying these to the proper distance or radius from the vertical spindle E, carrying the jointed wood boards X, the saw I cuts these tangentially at or near the level of its axis to a round shape, or it might be oval or other shape desired, while or according as the head-spindle E and disk D are slowly rotated in relation to the position the saw I is from the spindle E while cutting by the screw-wheel F and screw F', all as will hereinafter be described, and the front end boss I''', which secures the saw I, would in some cases have cutting-knives $i$ $i$ on it, so as to dress or bevel the under face of the wood head X close to and just as the edge is cut by the saw I. The saw-spindle I' is turned at a very high speed by a small band-pulley $c$ on it, actuated by a band $c'$ from a larger broad pulley $c^2$ on the first-motion or counter shaft G of the machine for the purpose. The said driving-band $c'$ allows the spindle I' of the saw I to be traversed to some extent in its bearings I$^2$ by a slide guide or rod $h$, fitted in guides $h'$ on the frame B. This guide $h$ has a gab-arm or cross-head $h''$, taking into a collar-boss secured on the back end of the spindle I', so as to shift and hold the spindle according as the slide-guide $h$ is actuated. This slide-rod $h$ is traversed automatically in one direction by the bell-crank lever H H', fulcrumed at H'', and a weight H$^2$, or it might be a spring, and has a lateral guide-arm $h^2$, secured on its forward end in front of the saw I, made to rub, or it might be rolled by a small roller on the edge of the disk D under the wood X as a templet, or it might be a guide or dummy pattern secured under the disk or the wood to be cut, (and retain and move the spindle I' in the opposite direction to that in which the weighted lever H' moves it,) and to the round, oval, rectangular, or other shape or contour the wood or head X of the cask or barrel is desired to be cut by the saw I, as indicated at D and in dotted lines at X in Figs. 6, 7, and 8, and be also simultaneously beveled or chamfered on the top to finish the edge to the desired thickness to enter and fit the chime-groove of the cask or barrel, all as will hereinafter be described. The said beveling of the upper side or surface of wood X to reduce its edge to the desired thickness, just as it has been cut to the proper shape by the saw I, is effected by a tapered or conoidal rotating boss-head, with cutting knives or blades $b'$ screwed or secured on it, and secured on the front end of the second fast-rotating spindle $b$, carried horizontally in bearing-blocks $b^2$ on the vertical slide-plate or open frame B$^3$, mounted in angled-edge or dovetailed guides B'' in the vertical side plate B' of the rectangular head-stock B, traversed in the slides A$^2$ of the top bed and carrying the saw-spindle I on its vertical plate B', as before described. The spindle $b$ of these rotating cutters $b'$ is actuated by a small band-pulley $b''$ and band $b^3$ from the pulley C$^2$ on the first-motion or counter shaft G, all as described in reference to the spindle I' of the saw I, and so that its spindle $b$ may be traversed to and fro in its bearings in the same manner as the saw-spindle I' is shifted and be effected by the same automatic slide-bar $h$ and cross-head $h''$, with an adjustable collar or slot connection at $h'''$, to be able to set the one more or less distant from the saw I to suit the thickness and diameter of the head or ends X of the casks and the best cutting position, and both actuated in one direction against the action of the templet-lever $h^2$ by the bell-crank weighted lever H H' H$^2$, all as before described.

Although the longitudinal shifting and setting of the spindle I' of the saw I and the spindle $b$ of the rotating planer or cutters $b'$ have been described as effected automatically against the action of a weight or spring by the edges of the disks D or equivalent dummy-shaping pattern rotating on the vertical spindle E, carrying the jointed wood boards X to be cut, this is not necessary in many cases, as the two spindles I' $b$ can be set and fixed in their relative position to each other longitudinally, and have their carrying head-stock B set and held in its slide-guides by its moving screw or equivalent lever-gear for the saw I and cutters $i$ and $b'$ to form and finish the wood X to the desired size of round heads or ends of the casks or barrels when these are being made.

Referring to Figs. 9 to 11 for forming irregular-shaped heads, such as for oval or rectangular heads X, with rounded corners, as indicated in Figs. 7 and 8, it is preferred to mount the upper horizontal spindle $b$ and its cutters and cutter-head $b'$, Fig. 3$^b$ in its vertical slide-frame B$^3$ in front of the vertical slide-guide frame B and right over the lower cutter-spindle I' and both radially to the axis of the spindle E and boss-head D D', carrying the head X, as shown in these two Figs. 9 and 10, to cut the head and wood X tangentially at the same point or curve of the head, as seen in Fig. 10, and preferably dispense with the saw I and have special cutters $i$, as indicated in Fig. 11, which would bevel the under edge of the wood X and cut the thin edge through to meet the bevel formed on the top by the cutters and boss $b'$ of the spindle $b$.

What I claim is—

1. In a machine for turning or shaping the heads or ends of casks or other like articles, the combination of an oscillating head-carrying frame with a traversing head-stock consisting of an open rectangular frame B with horizontal and vertical slides B$^2$ B$^3$, carrying the bearings I$^2$ $b^2$ of the rotating and reciprocating spindles I' $b$ of the adjustable saw I and planing or cutting knives $i$ $i$ and $b'$, as and for the purpose set forth.

2. In a machine for turning or shaping the heads of casks, the combination of an adjustable head-stock carrying reciprocating rotating spindles, with cutters and saws mounted thereon, and with an oscillating frame provided with a rotating vertical spindle carrying at its upper end a retaining-disk to hold the head to be formed, whereby the head may be brought to the saws tangentially, substantially as set forth.

In testimony whereof I have signed my name to this specification in the presence of two subscribing witnesses.

SAMUEL WRIGHT.

Witnesses:
JOHN SIME,
R. C. THOMSON.